June 19, 1945. F. WOERNER 2,378,612
UNDESIRED MODULATION DETECTION
Filed Nov. 1, 1941

Inventor:

Patented June 19, 1945

2,378,612

UNITED STATES PATENT OFFICE 2,378,612

UNDESIRED MODULATION DETECTION

Friedrich Woerner, Berlin, Germany; vested in the Alien Property Custodian

Application November 1, 1941, Serial No. 417,521
In Germany August 1, 1940

7 Claims. (Cl. 179—171.5)

This invention relates to a method for determining preferably detrimental modulations in transmitter arrangements in which high-frequency oscillations are modulated for example in accordance with signals. An object of the invention is to provide a method and an arrangement for determining in simple manner whether the modulation of a transmitter operates without distortions or not, more particularly whether the modulation of a transmitter, which operates with alteration of the amplitudes of the radiated high-frequency oscillations, is free from undesired frequency-modulation or not.

Another object of the invention is to provide a simple method and arrangement for examining the quality of a transmitter operating with frequency-modulation.

The difficulties arising in performing a linear modulation are known. Further it is known that it is difficult to determine whether the modulation of an amplitude-modulated transmitter operates without distortions or not, more particularly whether an undesired frequency-modulation is effected.

The invention describes a method and arrangement respectively which allows to observe the condition of a high-frequency oscillation with respect to its frequency during a modulation-process operating with a depth of modulation lying between 0 and 100%. The invention is based on the fact that in superimposing a frequency-modulated carrier with a constant frequency there arise spurious frequencies having different values in accordance with the depth of modulation. In accordance with the invention, the oscillation of a transmitter to be analysed or examined is modulated with a sinusoidal or preferably saw-tooth voltage of low frequency and heterodyned with an oscillation of constant frequency, and the resulting beat-frequency is applied to the control-grid of a cathode-ray tube (Braun tube, oscillograph and television-tube respectively). The electron-beam of this tube scans the screen of the tube producing an image having, for example, a rectangular area (frame) or a circular area respectively.

The frame frequency or the rotation-frequency respectively of this electron-beam is chosen to be the same as the frequency of the modulating oscillation of the transmitter to be analysed or examined and for example amounts to 10 to 100 cycles p. s.; if low beat-frequencies are to be expected it is chosen to 100–1000 cycles p. s., and, if higher beat-frequencies are to be expected, it amounts to still higher frequency-values.

The accuracy of such a measuring is greater if a rectangular scanning area (frame) of the electron-beam is used, and smaller in case of circular scanning by the electron-beam. The latter case means, that a polar diagram or a spiral diagram is shown on the screen of the tube. If a rectangular scanning area and a saw-tooth modulation-frequency is used and further an undesired frequency-modulation is present the effect on the image-screen of the tube is as follows:

The frequency of the transmitter is changing in accordance with the saw-tooth modulation-potential and correspondingly also the resulting beat-frequency changes provided that the heterodyne-frequency is constant. This changing beat-frequency, which may be amplified in a separate amplifier applied to the control-grid of the Braun-tube, causes the ray to describe on the screen a path in points or dashes. The distance of these points or dashes from each other varies in accordance with the frequency-value of the resulting beat-frequency provided that the line-frequency is constant. These distances are the larger the lower the beat-frequency. If the ray begins its path on the left upper side of the screen at the time $t=0$ and if the sawtooth modulation potential of the transmitter is increasing at the same time, there is produced, in case of a frequency-modulation, at first a low and later a higher beat-frequency, which means that the points appear on the screen at first at larger, later at smaller distances or vice versa depending on the constant heterodyne-frequency being higher or lower than the modulated transmitter-frequency. Accordingly there results on the screen in case of a rectangular scanning area an image consisting of diverging lines (as shown for example in Fig. 2).

The line-frequency needs not to be high and amounts for example to 2500 up to 5000 cycles corresponding to an image or scanning area with 100 to 200 lines and 25 frames p. s. If the line- and frame-frequency is known, one may measure in simplest manner on the screen the frequency-change for each value of the depth of modulation of the transmitter.

As already mentioned above the transmitter may be also modulated with a sinusoidal oscillation, and then the period of the oscillation changes if a frequency-modulation arises.

If a polar diagram is used on the screen the circuit arrangement is the same except for the changes necessary to the production of the polar potential. The accuracy of measuring, however, is smaller since the whole modulation characteristic is indicated along the extent of the single circle and accordingly the distances of the points or dashes on the screen are very small, more particularly for high beat-frequencies. In case of such polar diagrams there are various possibilities of forming the image on the screen. For example the electron-beam may be intensity-modulated and then it reproduces on the screen a circular curve consisting of single points, the distances of which are varied. Further, for example, also the beat-frequency may be applied to a concentric deflecting system of the cathode-ray tube, and then the beat-frequency appears on the screen in form of a sinusoidal wave for example. Using a spiral diagram on the screen greater accuracy is effected than in case of a circular diagram since in a spiral diagram the spiral curve has a longer extent than a circular curve.

In the accompanying drawing

Fig. 1 represents diagrammatically an arrangement in accordance with the invention. Figs. 2-5 show some forms of diagrams on the screen of the cathode-ray tube.

Referring specifically to Fig. 1, 1 is the transmitter set to be analysed or examined, 2 is the oscillator which generates the constant heterodyne-frequency, 3 is a mixing-detector-stage, wherein the modulated oscillations of the transmitter are mixed with the constant local oscillation of 2 and which may be associated with an amplifier stage. 4 designates a generator for the relaxation oscillations effecting the horizontal and vertical deflection of the ray in the Braun-tube 5, the image-screen of which is shown. One of both the relaxation-oscillations generated by 4, 5, the frame frequency, is used for modulating the transmitter 1 and is accordingly connected also to 1 as shown.

Figure 4:
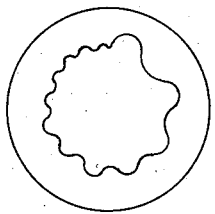

Fig. 4 shows the image on the screen, if a polar diagram i. e. a circular diagram is used. In this case a circular curve of wave-form appears on the screen and an undesired frequency modulation then may be concluded from the change of the period of this wave on the screen. This curve of wave-form is produced, if the beat-frequency is applied to a concentric deflecting system of the Braun tube. If, however, the electron-beam is intensity-modulated, then there appears no waveformed circular curve on the screen but a circular curve consisting of single points or dashes; and in case the transmitter to be examined is for example frequency-modulated the distances of these points or dashes vary.

Figure 5:
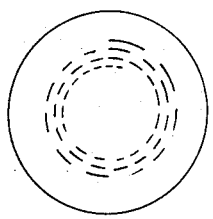

Fig. 5 represents the screen with a spiral diagram in case the intensity-modulated transmitter is distorted by an undesired frequency modulation.

Figure 1:
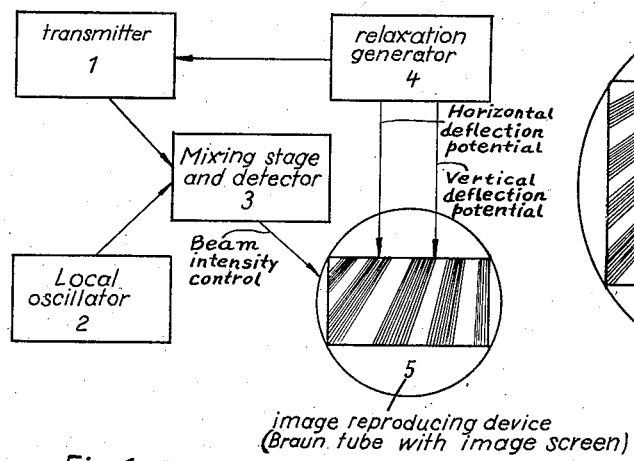
Figure 2:
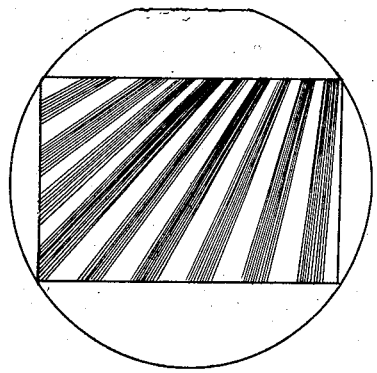
Fig. 2 shows the image on the screen, if a low frequency-modulation of the transmitter occurs. In this case diverging strips or lines appear on the screen.
Figure 3:
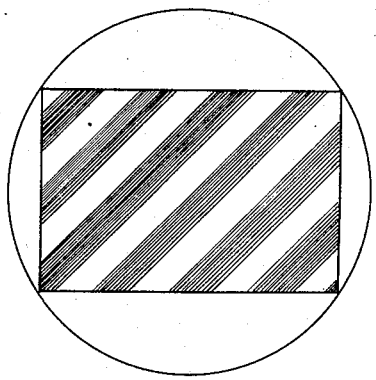
Fig. 3 shows the image on the area, if no frequency-modulation occurs. It is obvious from these Figs. 2 and 3 that the method of the invention thus indicates at once any for example undesired distortion of the modulation.

The invention makes possible to analyse the oscillations of a transmitter set and to make apparent any, for example, undesired change of the modulated oscillations i. e. each distortion of the transmitted oscillations. On the other hand the method or the apparatus in accordance with the invention permits indication of the modulation-quality of a transmitter operating with frequency modulation. For example a linear frequency-modulation may be concluded from the symmetrical diverging strips on the screen of the Braun-tube in accordance with Fig. 2.

Further the method according to the invention permits indication of other defects of a transmitter, for example the humming noise. If such a humming noise is produced the diagram on the screen must show curved lines instead of rectilinear lines provided that the oscillator (2) operates without distortions.

I claim:

1. The method of indicating the modulation in a transmitter of the frequency-modulation type, the steps of, modulating the transmitter potential with a periodically varying potential, mixing the transmitter oscillations with a constant unmodulated heterodyne frequency potential, producing a cathode ray, applying to said cathode ray scanning potentials having frequencies which are a function of said periodically varying potential to deflect the ray both horizontally and vertically, modifying the intensity of said ray in accordance with the beat frequency produced by said mixing, and causing said ray to produce a visible pattern.

2. The method as described in claim 1 wherein the scanning is a rectangular scanning operation.

3. The method as described in claim 1 wherein the scanning is along a circular path.

4. The method as described in claim 1 wherein the scanning is along a spiral path.

5. The method as described in claim 1 wherein two scanning potentials are applied to deflect the cathode ray thereby to scan a rectangular area and wherein one of the scanning potentials constitutes the source of said periodically varying potential.

6. In a system for indicating the modulation of a transmitter arrangement, the combination with a transmitter set having means for producing oscillations, a local oscillator for generating constant heterodyne frequency, a mixing detector fed by said transmitter and oscillator, a cathode ray tube having a control grid and an image screen, a relaxation-oscillation generator connected to said tube for supplying vertical and horizontal scanning potentials thereto, connections between said generator and set for supplying a modulating potential to said set, for modulating the frequency of said oscillations and connections between said mixer and said control grid of the cathode ray tube for modifying the cathode ray in accordance with the beat frequency produced by said mixer.

7. The method as described in claim 1 wherein said periodically varying potential is saw tooth.

FRIEDRICH WOERNER.